(12) United States Patent
Kitakubo et al.

(10) Patent No.: US 11,167,869 B2
(45) Date of Patent: Nov. 9, 2021

(54) TAPING DEVICE AND TAPING METHOD

(71) Applicant: Taiyo Yuden Co., Ltd., Tokyo (JP)

(72) Inventors: Hidenao Kitakubo, Tokyo (JP); Shuntaro Murayama, Tokyo (JP); Tomofumi Akiba, Tokyo (JP); Koji Saito, Tokyo (JP)

(73) Assignee: Taiyo Yuden Co., Ltd, Tokyo (JP)

( * ) Notice: Subject to any disclaimer, the term of this patent is extended or adjusted under 35 U.S.C. 154(b) by 153 days.

(21) Appl. No.: 16/375,838

(22) Filed: Apr. 4, 2019

(65) Prior Publication Data

US 2019/0308757 A1 Oct. 10, 2019

(30) Foreign Application Priority Data

Apr. 5, 2018 (JP) .............................. JP2018-072909

(51) Int. Cl.
| | |
|---|---|
| *B65D 73/02* | (2006.01) |
| *B65B 9/04* | (2006.01) |
| *B65D 75/42* | (2006.01) |
| *B65G 47/80* | (2006.01) |

(52) U.S. Cl.
CPC ................ *B65B 9/04* (2013.01); *B65D 73/02* (2013.01); *B65D 75/42* (2013.01); *B65G 47/80* (2013.01)

(58) Field of Classification Search
CPC ......... B65D 73/02; B65B 15/04; B65B 35/26; B65G 29/00
See application file for complete search history.

(56) References Cited

U.S. PATENT DOCUMENTS

| | | | |
|---|---|---|---|
| 9,248,927 B2* | 2/2016 | Saito | .................... H05K 13/028 |
| 2014/0157590 A1* | 6/2014 | Saito | ...................... B65B 15/00 |
| | | | 29/729 |

FOREIGN PATENT DOCUMENTS

| | | |
|---|---|---|
| JP | 2002-029505 A | 1/2002 |
| JP | 2006-168754 A | 6/2006 |

* cited by examiner

*Primary Examiner* — Chelsea E Stinson
(74) *Attorney, Agent, or Firm* — Chip Law Group

(57) ABSTRACT

A taping device includes a device base with a tape traveling groove in a front surface of the device base; a parts conveying disk including parts housing grooves in an outer circumferential surface of the parts conveying disk at regular angular intervals and a rear surface disposed to face the front surface of the device base; a disk rotating mechanism for intermittently rotating the parts conveying disk; a parts feeding mechanism for feeding, in a parts feeding zone, the parts into the parts housing grooves; and a parts inserting mechanism for inserting, at a parts insertion position, the parts from the parts housing grooves into the parts housing recessed portions.

4 Claims, 10 Drawing Sheets

TAPING DEVICE AND TAPING METHOD

CROSS REFERENCE TO RELATED APPLICATION

This application is based upon and claims benefit of priority from Japanese Patent Application No. 2018-072909, filed on Apr. 5, 2018, the entire contents of which are incorporated herein by reference.

BACKGROUND

The present disclosure relates to a taping device with a function to sequentially insert parts into parts housing recessed portions of an intermittently traveling carrier tape, and a taping method thereof.

The above-described taping device generally includes a parts conveying disk serving to receive parts while intermittent rotation is stopped and to deliver the received parts to the carrier tape (see Japanese Patent Laid-Open No. 2002-029505 (hereinafter referred to as Patent Document 1) and Japanese Patent Laid-Open No. 2006-168754 (hereinafter referred to as Patent Document 2)).

For the above-described taping device, particularly, a taping device intended for small parts (for example, electronic components with a maximum size of smaller than or equal to 1 mm) to be inserted into the carrier tape, allowing the following to be performed without any difficulty is most important to improve yield: reception and delivery of parts by the parts conveying disk, that is, feeding of parts to the parts conveying disk and insertion of the parts from the parts conveying disk into the carrier tape, particularly, reception of parts by the parts conveying disk, that is, feeding of parts to the parts conveying disk.

However, in the device disclosed in Patent Document 1, when, in a case of small parts, an intermittent rotation speed of the conveying table is increased in order to improve the yield, feeding of parts from a work feeder to housing grooves in the conveying table may be affected. Furthermore, in the device disclosed in Patent Document 2, when, in the case of small parts, the intermittent rotation speed of the conveying table is increased in order to improve the yield, feeding of parts from a parts feeder included in a feeding device to holding holes in the conveying table may be affected.

SUMMARY

It is desirable to provide a taping device and a taping method capable of appropriately feeding parts to a parts conveying disk even in a case where the parts are small.

According to an embodiment of the present disclosure, there is provided a taping device with a function to sequentially insert parts into parts housing recessed portions of an intermittently traveling carrier tape, the taping device including a device base with a tape traveling groove in a front surface of the device base, a parts conveying disk including parts housing grooves in an outer circumferential surface of the parts conveying disk at regular angular intervals and a rear surface disposed to face the front surface of the device base, a disk rotating mechanism for intermittently rotating the parts conveying disk, a parts feeding mechanism for feeding, in a parts feeding zone, the parts into the parts housing grooves, and a parts inserting mechanism for inserting, at a parts insertion position, the parts from the parts housing grooves into the parts housing recessed portions, in which each of the parts is shaped generally like a rectangular parallelepiped having a relationship of length>width and height, each of the parts housing grooves is shaped generally like a rectangular parallelepiped having a slightly larger length than a length of the part and having a width and a depth slightly larger than a width and a height of the part, and the parts feeding mechanism is configured such that, in the parts feeding zone, a longitudinal portion of the part enters one of the parts housing grooves in a lengthwise orientation, and a parts reorientation zone is set between the parts feeding zone and the parts insertion position, and the parts reorientation zone is provided with a parts reorienting mechanism for reorienting the part with the longitudinal portion of the part having entered the parts housing groove to place the part in the parts housing groove in an orientation aligned with the parts housing groove.

According to another embodiment of the present disclosure, there is provided a taping method including sequentially inserting parts into parts housing recessed portions of an intermittently traveling carrier tape, the sequentially inserting including intermittently rotating a parts conveying disk with parts housing grooves in an outer circumferential surface of the parts conveying disk at regular angular intervals, feeding, in a parts feeding zone, the parts into the parts housing grooves, and inserting, at a parts insertion position, the parts from the parts housing grooves into the parts housing recessed portions, in which each of the parts is shaped generally like a rectangular parallelepiped having a relationship of length>width and height, and each of the parts housing grooves is shaped generally like a rectangular parallelepiped having a slightly larger length than a length of the part and having a width and a depth slightly larger than a width and a height of the part, the part is fed in the parts feeding zone such that a longitudinal portion of the part enters one of the parts housing grooves in a lengthwise orientation, and a parts reorienting mechanism reorients, in a parts reorientation zone set between the parts feeding zone and the parts insertion position, the part with the longitudinal portion of the part having entered the parts housing groove to place the part in the parts housing groove in an orientation aligned with the parts housing groove.

The taping device and the taping method according to the present disclosure allow parts to be appropriately fed to the parts conveying disk even in a case where the parts are small.

BRIEF DESCRIPTION OF THE DRAWINGS

FIG. 6A and FIG. 6B are partially enlarged cross-sectional views (also used as views illustrating operations)

illustrating a configuration of a parts reorientation zone of the taping device illustrated in FIG. 2 and FIG. 3;

DETAILED DESCRIPTION OF THE PREFERRED EMBODIMENT

Figure 1A:
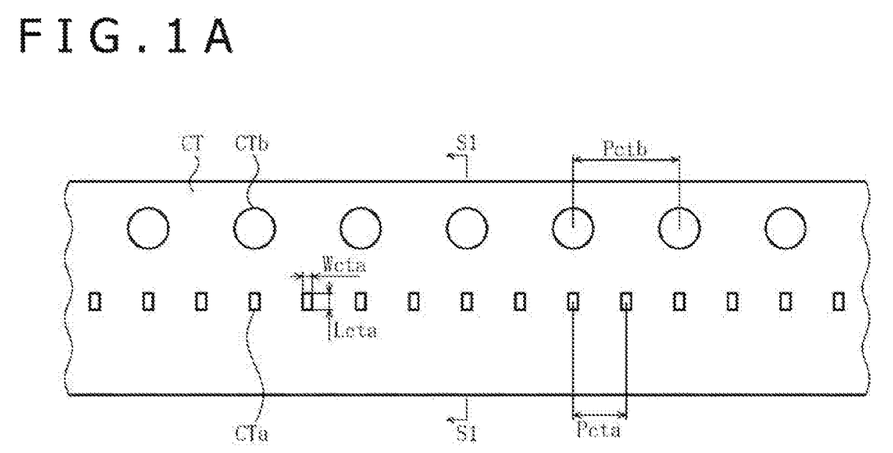
FIG. 1A is a partial top view of a carrier tape.
Figure 1B:
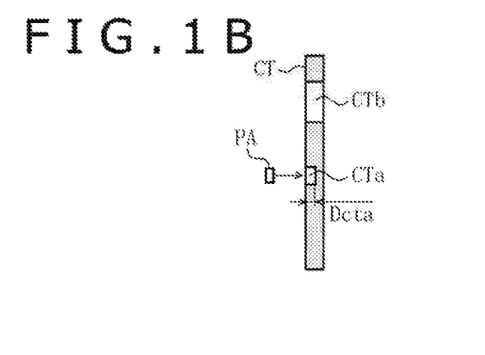
FIG. 1B is a cross-sectional view taken along line S1-S1 in FIG. 1A.
Figure 1C:
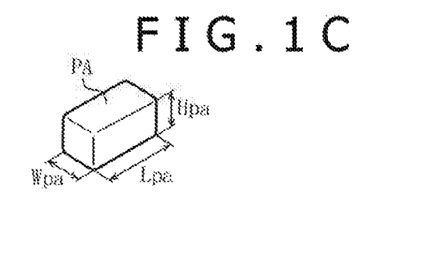
FIG. 1C is an enlarged perspective view of a part illustrated in FIG. 1B.

First, a configuration of a carrier tape CT used for a taping device TM described below and a configuration of a part PA will be described using FIGS. 1A, 1B and 1C.

The carrier tape CT is shaped like a band with a substantially constant width and a substantially constant thickness, and includes parts housing recessed portions CTa arranged in one surface of the carrier tape CT at a pitch Pcta in a tape traveling direction (lateral direction in FIG. 1A) and each including a recessed portion shaped generally like a rectangular parallelepiped. Furthermore, the carrier tape CT includes feeding holes CTb arranged at a pitch Pctb different from the pitch of the parts housing recessed portions CTa in the tape traveling direction (lateral direction in FIG. 1A) and each including a generally cylindrical hole with which protruding portions 53a (see FIG. 2) of a sprocket 53 for tape feeding is engaged.

Each of the parts housing recessed portions CTa has a length Lcta slightly larger than a numerical value of a reference dimension of a length LPa (see FIG. 1C) of the part PA plus a plus-side dimensional tolerance, and a width Wcta and depth Dcta each of which is slightly larger than a numerical value of a reference dimension of each of a width WPa and a height HPa (see FIG. 1C) of the part PA plus a plus-side dimensional tolerance.

The part PA is shaped generally like a rectangular parallelepiped in which the reference dimensions of the length Lpa, the width Wpa, and the height Hpa have a relationship of length>width=height. The part PA can be inserted and placed in one of the parts housing recessed portions CTa of the carrier tape CT in an orientation aligned with the parts housing recessed portion CTa. Note that the length Lpa, the width Wpa, and the height Hpa have respective dimensional tolerances and that, whereas length Lpa>width Wpa=height Hpa in some actual parts PA, length Lpa>width Wpa>height Hpa or length Lpa>height Hpa>width Wpa in other actual parts PA. That is, in regard to the reference dimensions of the length Lpa, the width Wpa, and the height Hpa, parts having the relationship of length>width>height and parts having the relationship of length>height>width can also be inserted into the parts housing recessed portions CTa.

Furthermore, in a case of small parts PA, the maximum size is smaller than or equal to 1 mm. Specifically, examples of the reference dimensions include a length Lpa of 1 mm, a width Wpa of 0.5 mm, and a height Hpa of 0.5 mm, a length Lpa of 0.6 mm, a width Wpa of 0.3 mm, and a height Hpa of 0.3 mm, and a length Lpa of 0.4 mm, a width Wpa of 0.2 mm, and a height Hpa of 0.2 mm. Moreover, main examples of the parts PA are electronic components such as capacitor elements, varistor elements, and inductor elements. However, any parts other than the electronic components may be used so long as the parts PA can be magnetically attracted.

Figure 2:
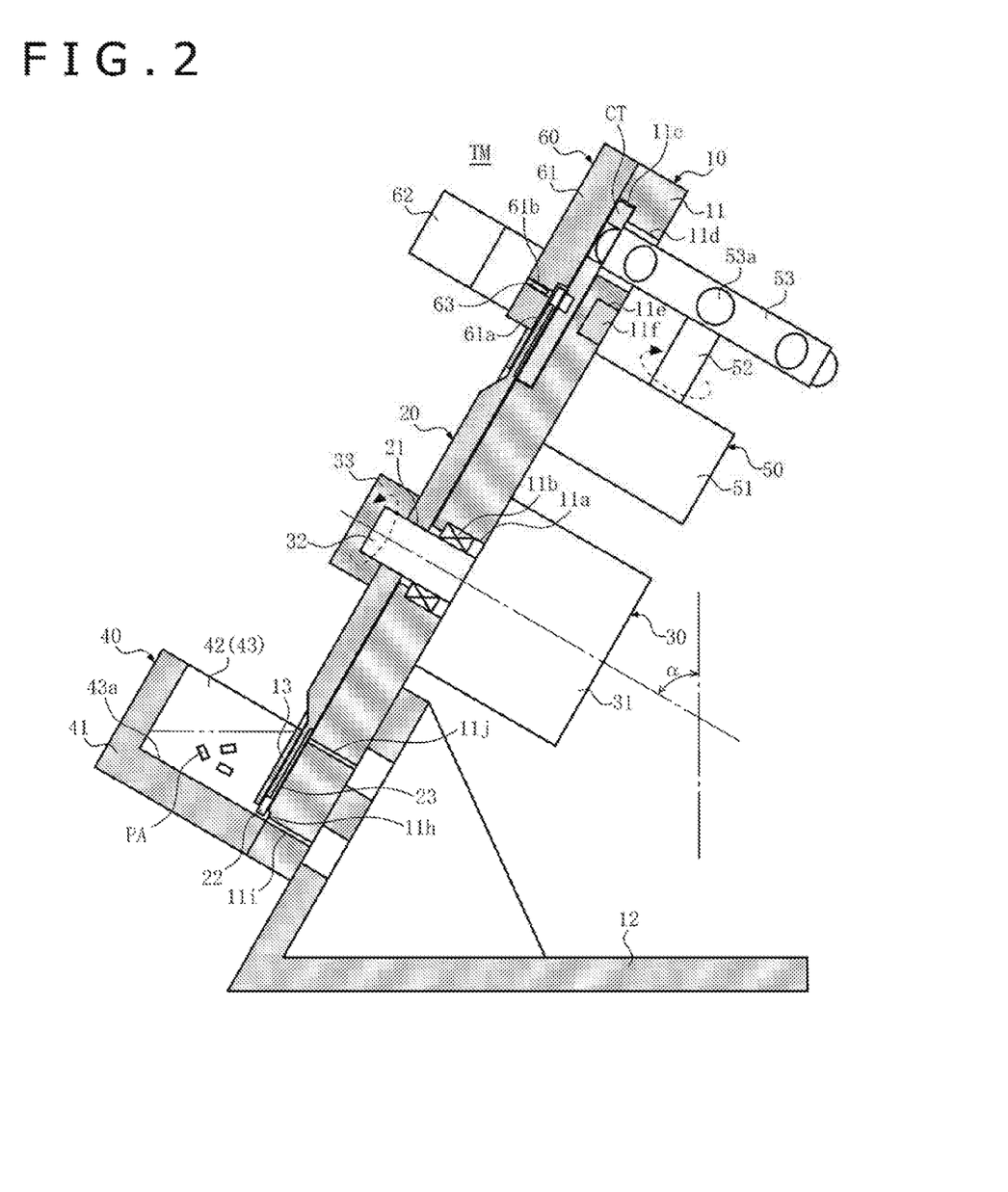
FIG. 2 is a longitudinal cross-sectional view (corresponding to a cross-sectional view taken along line S2-S2 in FIG. 3) of a taping device to which the present disclosure is applied.
Figure 3:
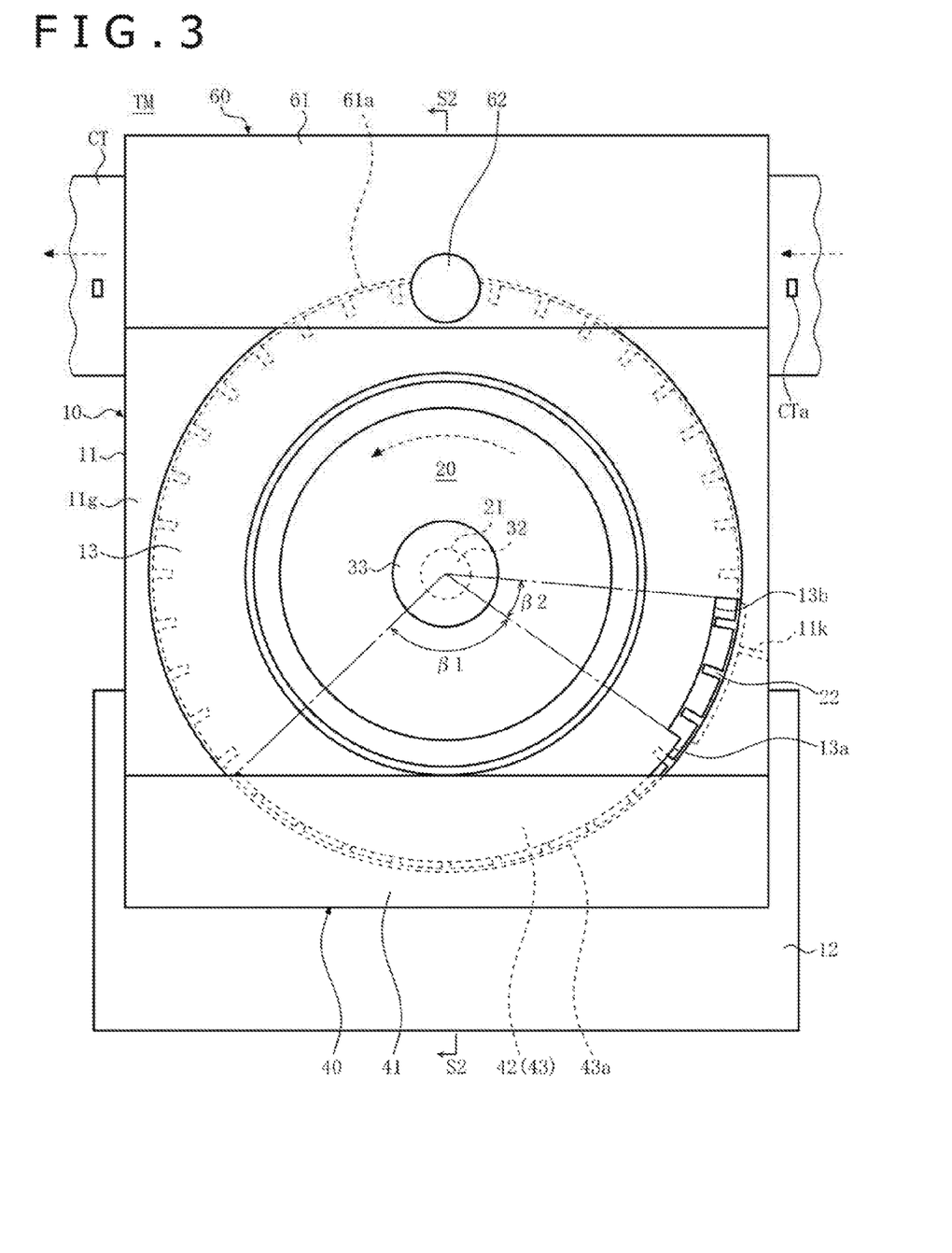
FIG. 3 is a diagram of the taping device illustrated in FIG. 2 as viewed from a direction in which the taping device squarely faces a front surface of a parts conveying disk.

Now, a configuration of the taping device TM will be described using FIGS. 2, 3, 4A, 4B, 5A, 5B, 6A, 6B, 7A and 7B. Here, for convenience of description, a left side in FIG. 2 is represented as a front side, a right side in FIG. 2 is represented as a rear side, a side closer to the reader with respect to the sheet of FIG. 2 is represented as a left side, a side farther from the reader with respect to the sheet of FIG. 2 is represented as a right side, an upper side in FIG. 2 is represented as an upper side, and a lower side in FIG. 2 is represented as a lower side. For the other drawings, the directions are similarly represented. FIG. 3 is a diagram of the taping device TM as viewed from a direction in which the taping device TM squarely faces a front surface of a parts conveying disk 20, and is not a diagram of the taping device TM as viewed from the left side in FIG. 2. Furthermore, FIG. 2 corresponds to a cross-sectional view taken along line S2-S2 in FIG. 3. Moreover, for convenience of description, FIGS. 6A and 6B are illustrated in the same direction as that of FIGS. 5A and 5B.

As illustrated in FIG. 2 and FIG. 3, the taping device TM includes a device base 10, the parts conveying disk 20, a disk rotating mechanism 30, a parts feeding mechanism 40, a tape feeding mechanism 50, a parts inserting mechanism 60, a parts reorienting mechanism described below (reference numeral omitted), and a cover tape attaching mechanism (not illustrated). Note that the cover tape attaching mechanism (not illustrated) is a mechanism attaching a cover tape for closing the parts housing recessed portions CTa, to one surface of the carrier tape CT by thermocompression bonding or the like after the parts PA are inserted into the parts housing recessed portions CTa.

In the taping device TM, an angular zone in which the parts conveying disk 20 enters a parts storage chamber 43 of the parts feeding mechanism 40 corresponds to a parts feeding zone (reference numeral omitted), an angular zone denoted as β2 corresponds to a parts reorientation zone (reference numeral omitted), and a position where a solenoid 62 of the parts inserting mechanism 60 is disposed corresponds to a parts insertion position (reference numeral omitted).

As illustrated in FIG. 2 and FIG. 3, the device base 10 includes a main plate 11 with a generally rectangular longitudinal cross section, an inclination support portion 12 supporting the main plate 11 such that the main plate 11 is inclined rearward, and a disk front surface guide 13 provided on a front surface of the main plate 11.

A shaft arrangement hole 11a including a generally cylindrical hole is formed substantially at the center of the main plate 11. A bearing 11b is provided in the shaft arrangement hole 11a. Furthermore, a tape traveling groove 11c including a generally rectangular longitudinal cross section is formed in an upper portion of the front surface of the main plate 11 to extend in the lateral direction. The tape traveling groove 11c has a width and a depth slightly larger than a width and a thickness of the carrier tape CT.

Moreover, sprocket arrangement holes 11d are formed in an upper portion of a rear surface of the main plate 11; the sprocket arrangement holes 11d include generally rectangular-parallelepiped-shaped holes and lead to the tape traveling groove 11c. Positions of the sprocket arrangement holes 11d in an up-down direction correspond to positions in the up-down direction of feeding holes CTb in the carrier tape CT disposed in the tape traveling groove 11c.

Moreover, a magnet arrangement groove 11e including a groove with a generally rectangular longitudinal cross section is formed in the rear surface of the main plate 11 below the sprocket arrangement holes 11d to extend in the lateral direction. The magnet arrangement groove 11e is provided with a band-like permanent magnet 11f including a rare-earth permanent magnet. A position of the permanent magnet 11f in the up-down direction corresponds to a position in the up-down direction of the parts housing recessed portions CTa of the carrier tape CT disposed in the tape traveling groove 11c. That is, a magnetic force of the permanent magnet 11f acts on the parts housing recessed portions CTa of the carrier tape CT disposed in the tape traveling groove 11c.

Moreover, disk outer-circumferential-surface guides 11g are provided on the front surface of the main plate 11 between a main plate 41 of the parts feeding mechanism 40 and a main plate 61 of the parts inserting mechanism 60 to cover both the right and left sides of an outer circumferential surface of the parts conveying disk 20. Each of the disk outer-circumferential-surface guides 11g includes an inner surface having a slightly larger radius of curvature than the parts conveying disk 20, and is larger in thickness than an outer circumferential portion of the parts conveying disk 20. Note that FIG. 2 and FIG. 3 illustrate that each of the disk outer-circumferential-surface guide 11g is formed integrally with the main plate 11 but may be configured separately from the main plate 11.

Moreover, a parts receiving portion 11h is continuously provided at a lower portion of the front surface of the main plate 11 and includes a recessed portion shaped generally like a circular arc; the parts receiving portion 11h extends from the parts feeding zone to the parts reorientation zone, an outer edge of the parts receiving portion 11h has a radius of curvature substantially equal to a radius of curvature of an inner surface of each disk outer-circumferential-surface guide 11g, and the parts receiving portion 11h has a smaller radius of curvature at an inner edge of the parts receiving portion 11h than at the outer edge. A difference in radius of curvature between the outer edge and the inner edge of the parts receiving portion 11h is slightly larger than a numerical value of the reference dimension of each of the width Wpa and the height Hpa (see FIG. 1C) of the part PA plus the plus-side dimensional tolerance. A parts sliding portion 11h1 (see FIGS. 5A and 5B) having a generally quarter circle-like longitudinal cross section is provided at a step portion between the parts receiving portion 11h and the front surface of the main plate 11.

Moreover, a second negative-pressure air hole 11i (see FIG. 2 and FIGS. 5A and 5B) is formed in a bottom surface of the parts receiving portion 11h of the main plate 11 within an angular range corresponding to the bottom surface. The second negative-pressure air hole 11i is used to cause negative pressure air for drawing to act on the part PA with a longitudinal portion of the part PA entering one of parts housing grooves 22 in the parts conveying disk 20.

Moreover, a first negative-pressure air hole 11j (see FIG. 2) is formed at the lower portion of the front surface of the main plate 11 inward of the second negative-pressure air hole 11i in association with the angular zone β2 corresponding to the parts reorientation zone. The first negative-pressure air hole 11j is used to cause negative pressure air for reorientation to act on a negative-pressure air groove 23 in the parts conveying disk 20. Note that FIG. 2 illustrates the first negative-pressure air hole 11j at a position corresponding to the parts feeding zone (position not corresponding to the parts reorientation zone) and that this illustration is provided for convenience to indicate a relative position between the first negative-pressure air hole 11j and the negative-pressure air groove 23 in the parts conveying disk 20 and that the first negative-pressure air hole 11j is actually not present in the parts feeding zone.

Moreover, the disk outer-circumferential-surface guide 11g in the left of the main plate 11 is provided with a positive-pressure air hole 11k (see FIG. 3, FIG. 6A, and FIG. 6B) used to cause positive-pressure air for reorientation to act on the remaining portion of the part PA with the longitudinal portion of the part PA having entered the parts housing groove 22 in the parts conveying disk 20 within an angular range corresponding to the parts reorientation zone.

A disk front surface guide 13 includes a generally annular plate and is provided inward of each disk outer-circumferential-surface guide 11g of the device base 10 to cover, in a non-contact manner, a front surface of the outer circumferential portion of the parts conveying disk 20 (except for an upper portion having entered a disk receiving portion 61a of the parts inserting mechanism 60). The disk front surface guide 13 preferably has a thickness smaller than a numerical value of the reference dimension of the length Lpa (see FIG. 1C) of the part PA minus a minus-side dimensional tolerance (see FIGS. 5A, 5B, 6A and 6B).

Furthermore, an outer circumferential surface of the disk front surface guide 13 is partly provided with a first cutout portion 13a shaped like a circular arc to regulate the parts PA such that the parts PA enter the parts housing grooves 22 in the parts conveying disk 20 in a lengthwise orientation, in the parts feeding zone, and a second cutout portion 13b shaped like a circular arc to allow the parts PA to be reoriented in the parts reorientation zone (see FIG. 3, FIG. 5A, FIG. 5B, FIG. 6A, and FIG. 6B).

An inner surface of the first cutout portion 13a of the disk front surface guide 13 has a smaller radius of curvature than a bottom surface 43a of the parts storage chamber 43. A difference in radius of curvature between the inner surface of the first cutout portion 13a and the bottom surface 43a of the parts storage chamber 43 is slightly larger than the reference dimension of each of the width Wpa and the height Hpa (see FIG. 1C) of the part PA plus the plus-side dimensional tolerance (see FIGS. 5A and 5B). Furthermore, an inner surface of the second cutout portion 13b of the disk front surface guide 13 has a radius of curvature smaller than a radius of curvature of an inner surface of each disk outer-circumferential-surface guide 11g (corresponding to a radius of curvature of the bottom surface 43a of the parts storage chamber 43) and than a radius of curvature of the inner surface of the first cutout portion 13a. A difference in radius of curvature between the inner surface of the second cutout portion 13b and the inner surface of each disk outer-circumferential-surface guide 11g is larger than a length L22 of each parts housing groove 22 in the parts conveying disk 20 (see FIGS. 6A and 6B).

In other words, the following are included in the parts reorienting mechanism (reference numeral omitted) for reorienting, in the parts reorientation zone, the part PA with the longitudinal portion of the part PA having entered the parts housing groove 22 in the parts conveying disk 20 to place the part PA in an orientation aligned with the parts housing groove 22: the second cutout portion 13b of the disk front surface guide 13 corresponding to the parts reorientation zone, the positive-pressure air hole 11k and the first negative-pressure air hole 11j in the main plate 11, and a portion of the second negative-pressure air holes 11i and a portion of the negative-pressure air groove 23 in the parts conveying disk 20, the portions being present in the parts reorientation zone.

Now, the disk front surface guide 13 will further be described. FIG. 2 and FIG. 3 illustrate that the disk front surface guide 13 does not protrude forward from a front surface of each disk outer-circumferential-surface guide 11g of the device base 10. However, the disk front surface guide 13 may be provided with a flange portion extending to the front surface of each disk outer-circumferential-surface guide 11g, and the flange portion may be disposed in contact with the front surface of each disk outer-circumferential-surface guide 11g.

Figure 8A:
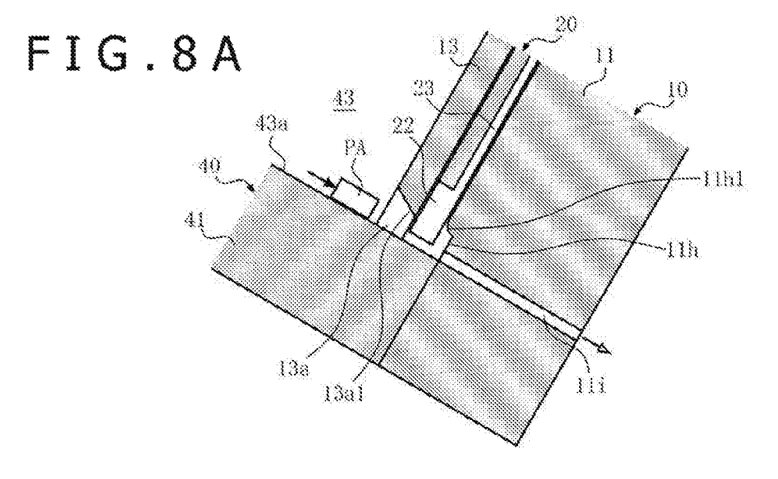
FIG. 8A and FIG. 8B are views corresponding to FIG. 5A and each illustrating a modified example of a first cutout portion of a disk front surface guide illustrated in FIGS. 4A and 4B.
Figure 8B:
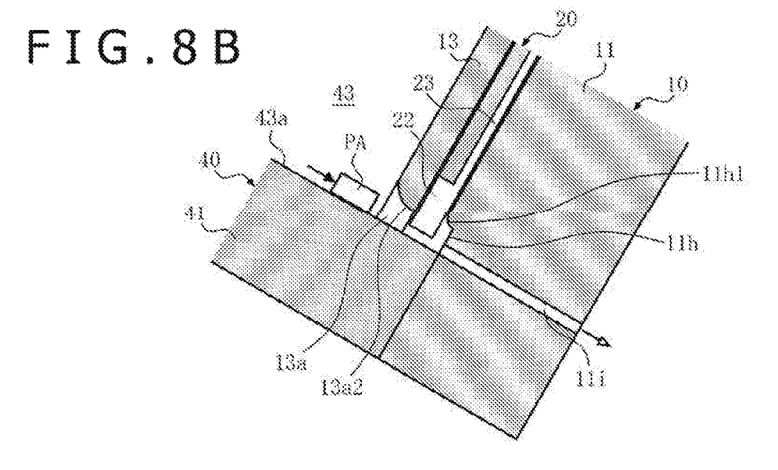

Furthermore, FIGS. 5A, 5B, 6A and 6B illustrate that the disk front surface guide 13 has a thickness smaller than the numerical value of the reference dimension of the length Lpa (see FIG. 1C) of the part PA minus the minus-side dimensional tolerance. However, the thickness of the disk front surface guide 13 may be larger than or equal to the same numerical value. Moreover, in a case where the thickness of the disk front surface guide 13 is increased, an inclined surface 13a1 or a protruding curved surface 13a2 may be formed on an inner surface of the first cutout portion 13a to allow the part PA entering one of the parts housing grooves 22 in the parts conveying disk 20 to be guided through the first cutout portion 13a, as illustrated in FIGS. 8A and 8B.

Moreover, FIG. 3 illustrates that the angular zone β1 of the first cutout portion 13a is slightly larger than the parts feeding zone (angular zone in which the parts conveying disk 20 is located in the parts storage chamber 43 of the parts feeding mechanism 40). However, the angular zone β1 of the first cutout portion 13a may be set equal in angle to the parts feeding zone and the parts reorientation zone (angular zone β2) may be enlarged by an amount equal to the resultant decrease in angle, or the angular zone β2 of the second cutout portion 13b corresponding to the parts reorientation zone may be enlarged upward compared to the angular zone β2 illustrated in FIG. 3.

Figures 4A, 4B:
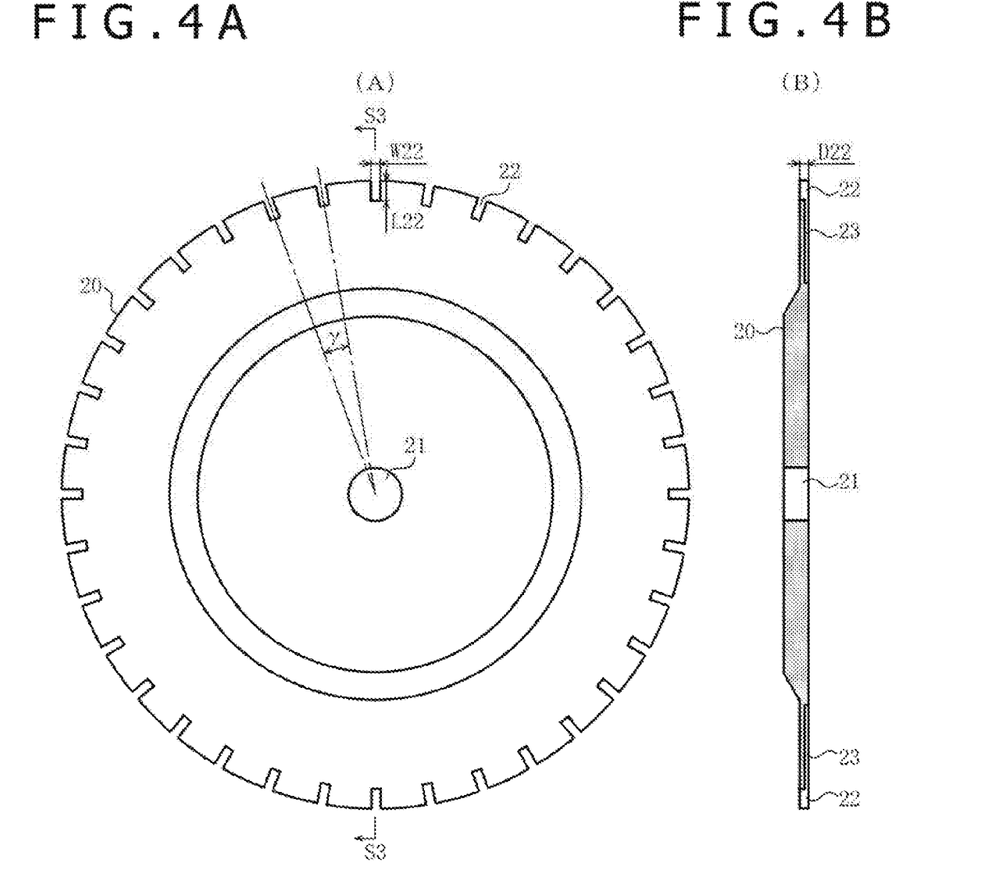
FIG. 4A is a front view of the parts conveying disk illustrated in FIG. 2 and FIG. 3.
FIG. 4B is a cross-sectional view taken along line S3-S3 in FIG. 4A.

As illustrated in FIGS. 4A and 4B, the parts conveying disk 20 includes a disk-shaped plate that is thinner in an outer circumferential portion than in the entire plate except for the outer circumferential portion, and includes a generally cylindrical shaft coupling hole 21 in a central portion of the parts conveying disk 20. Furthermore, the parts conveying disk 20 includes the parts housing grooves 22 formed in the outer circumferential surface of the parts conveying disk 20 at regular angular intervals (see an angle γ in FIG. 4A) and each including a generally rectangular-parallelepiped-shaped groove. Note that FIG. 4A illustrates, for convenience of illustration, that the parts conveying disk 20 includes a total of 36 parts housing grooves 22 at intervals of 10 degrees but that the total number of the parts housing groove 22 may be appropriately increased or reduced according to the radius of curvature of the parts conveying disk 20. Moreover, the negative-pressure air groove 23 in communication with each parts housing groove 22 is formed for each parts housing groove 22 or in association with all the parts housing grooves 22. The negative-pressure air groove 23 illustrated in FIG. 4B is omitted from FIG. 4A for convenience of illustration.

The length L22 of each parts housing groove 22 is slightly larger than the numerical value of the reference dimension of the length Lpa (see FIG. 1C) of the part PA plus the plus-side dimensional tolerance. The width W22 of each parts housing groove 22 is slightly larger than the numerical value of the reference dimension of each of the width Wpa and the height Hpa (see FIG. 1C) of the part PA plus the plus-side dimensional tolerance.

Furthermore, the depth D22 of each parts housing groove 22 is the same as the thickness of the outer circumferential portion of the parts conveying disk 20. The depth D22 is preferably smaller than the numerical value of the reference dimension of the length Lpa (see FIG. 1C) of the part PA minus the minus-side dimensional tolerance. That is, a longitudinal portion of the part PA can enter each parts housing groove 22 in a lengthwise orientation (see FIG. 5B) and can be housed in each parts housing groove 22 in an orientation aligned with the parts housing groove 22 (see FIG. 6B).

Moreover, the sum of the depth D22 of each parts housing groove 22 and the depth (reference numeral omitted) of the parts receiving portion 11h of the device base 10 is preferably slightly smaller than the reference dimension of the length Lpa (see FIG. 1C) of the part PA minus the minus-side dimensional tolerance. That is, an end surface of the part PA with the longitudinal portion of the part PA having entered each parts housing groove 22 in the lengthwise orientation may come into contact with the bottom surface of the parts receiving portion 11h of the device base 10. Note that the sum may be larger than or equal to the numerical value so long as an intended parts reorientation can be achieved.

As illustrated in FIG. 2, the disk rotating mechanism 30 includes a first motor 31 provided in the center of the rear surface of the main plate 11 of the device base 10. A motor shaft 32 of the first motor 31 is rotatably disposed in the shaft arrangement hole 11a of the main plate 11 via the bearing 11b. A tip portion of the motor shaft 32 is inserted into the shaft coupling hole 21 of the parts conveying disk 20. A protruding portion of the tip portion is coupled to the parts conveying disk 20 using a coupler 33. That is, the parts conveying disk 20 is capable of being intermittently rotated, by intermittently rotating the motor shaft 32 of the first motor 31, around an axis of the motor shaft 32 with a rear surface of the parts conveying disk 20 facing the front surface of the main plate 11 of the device base 10. Note that FIG. 2 illustrates that an angle α between the axis of the motor shaft 32 of the first motor 31 and an imaginary vertical line is 60 degrees (the main plate 11 of the device base 10 and the parts conveying disk 20 are inclined rearward at an angle of 30 degrees), but the angle α may be less or more than 60 degrees so long as the angle α falls within the range of acute angles and that setting the angle α within the range of 45 to 75 degrees preferably suffices.

As illustrated in FIG. 2 and FIG. 3, the parts feeding mechanism 40 includes the main plate 41 provided below the front surface of the main plate 11 of the device base 10 and having a generally L-shaped longitudinal cross section, the parts storage chamber 43 formed by an inner space 42 of the main plate 41, and the above-described second negative-pressure air hole 11i. The parts storage chamber 43 is configured to store the parts PA in bulk (in random orientations). The bottom surface 43a of the parts storage chamber 43 has a radius of curvature substantially equal to the radius of curvature of the inner surface of each disk outer-circumferential-surface guide 11g of the device base 10 (the radius of curvature of the bottom surface 43a is slightly larger than the radius of curvature of the parts conveying disk 20). The bottom surface 43a is inclined downward toward one of those parts housing grooves 22 present in the parts feeding zone, according to the angle α illustrated in FIG. 2.

As illustrated in FIG. 2, the tape feeding mechanism 50 includes a second motor 51 provided on an upper portion of the rear surface of the main plate 11 of the device base 10 and the sprocket 53 coupled to a motor shaft 52 of the second motor 51. The sprocket 53 includes the protruding portions 53a provided on an outer circumferential surface of the sprocket 53 at angular intervals corresponding to the pitch Pctb of the feeding holes Ctb in the carrier tape CT. A portion of the sprocket 53 is disposed in the sprocket arrangement hole 11d in the device base 10. At least one of the protruding portions 53a can engage with any of the feeding holes CTb in the carrier tape CT disposed in the tape traveling groove 11c. That is, the carrier tape CT disposed in the tape traveling groove 11c can be allowed, by intermittently rotating the motor shaft 52 of the second motor 51 and the sprocket 53, to travel intermittently in the lateral direction and substantially parallel to an upper portion of the rear surface of the parts conveying disk 20.

As illustrated in FIG. 2 and FIG. 3, the parts inserting mechanism 60 includes the main plate 61 on the upper portion of the front surface of the main plate 11 of the device base 10, a solenoid 62 provided on the main plate 61, and one parts pressing rod 63 coupled to a plunger (illustration omitted) of the solenoid 62. The main plate 61 includes a disk receiving portion 61a provided below a rear surface of the main plate 61 and including a generally bow-shaped recessed portion through which the upper portion of the parts conveying disk 20 can pass. An upper surface of the disk receiving portion 61a has a radius of curvature substantially equal to the radius of curvature of the inner surface of each disk outer-circumferential-surface guide 11g (the radius of curvature of the upper surface is slightly larger than the radius of curvature of the parts conveying disk 20). Furthermore, a rod guide hole 61b corresponding to the uppermost parts housing groove 22 in the parts conveying disk 20 is formed below the main plate 61. The parts pressing rod 63 is disposed in the rod guide hole 61b and is movable in a front-rear direction.

Operations of the above-described taping device TM will now be described using FIGS. 1A, 1B, 1C, 2, 3, 4A, 4B, 5A, 5B, 6A, 6B, 7A and 7B, that is, operations of sequentially inserting the parts PA into the parts housing recessed portions CTa of the carrier tape CT will be described.

In operation, a large number of parts PA are stored in bulk in the parts storage chamber 43 of the parts feeding mechanism 40, and the carrier tape CT is inserted and placed in the tape traveling groove 11c in the device base 10 (see FIG. 2 and FIG. 3).

The motor shaft 32 of the first motor 31 of the disk rotating mechanism 30 is intermittently rotated to intermittently rotate the parts conveying disk 20 at the angle γ in FIG. 4A in the direction of a dashed arrow in FIG. 3. The motor shaft 52 of the second motor 51 of the tape feeding mechanism 50 and the sprocket 53 are intermittently rotated to cause the carrier tape CT to travel intermittently in the direction of a dashed arrow in FIG. 3 at the pitch Pcta in FIG. 1A. Furthermore, negative air pressure is applied to the second negative-pressure air hole 11i and the first negative-pressure air hole 11j of the device base 10, and positive air pressure is applied to the positive-pressure air hole 11k.

Figure 5A:
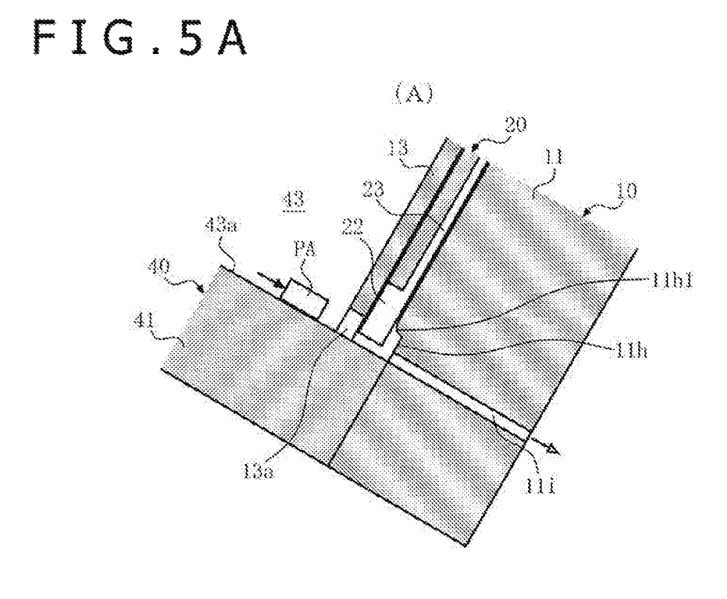
FIG. 5A and FIG. 5B are partially enlarged cross-sectional views (also used as views illustrating operations) illustrating a configuration of a parts feeding zone of the taping device illustrated in FIG. 2 and FIG. 3.
Figure 5B:
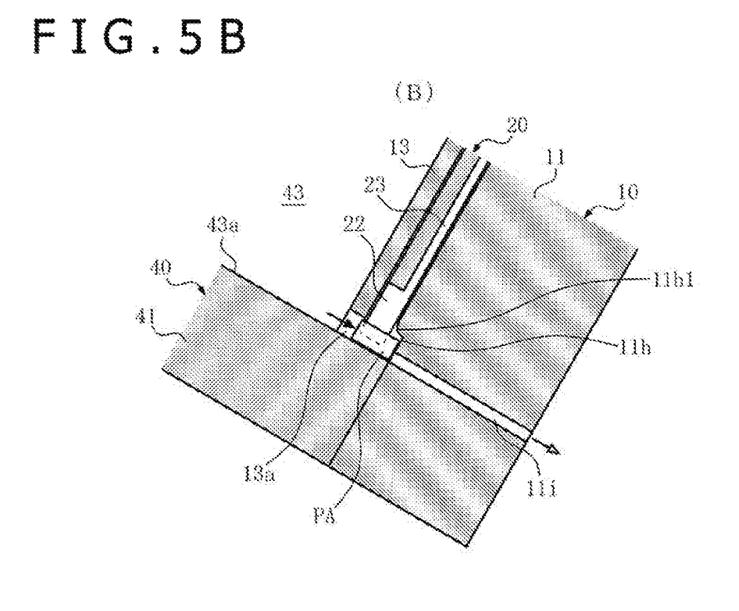
Figure 6A:
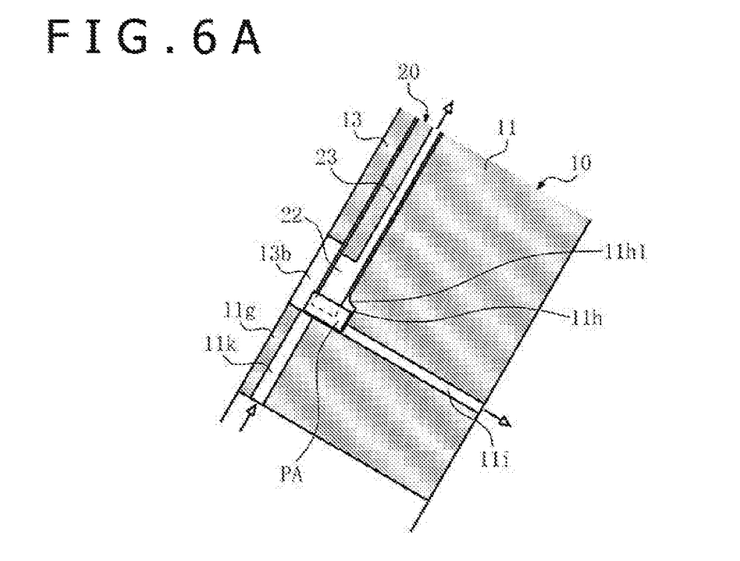
Figure 6B:
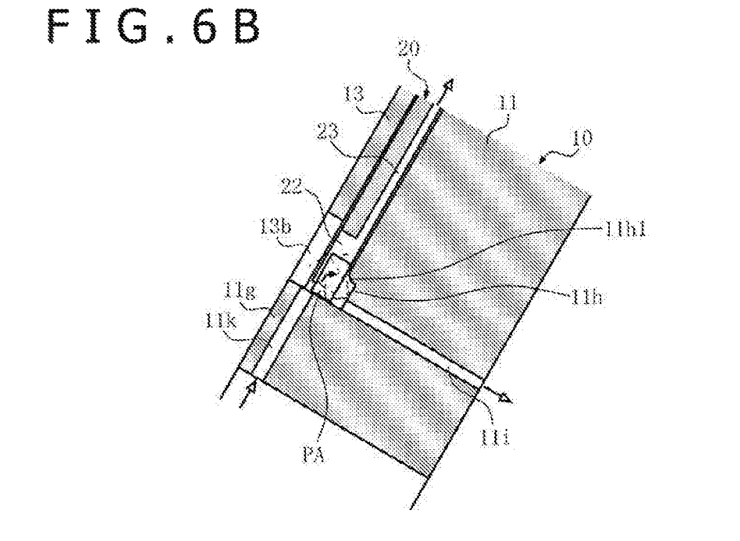

In the parts feeding zone, as illustrated in FIGS. 5A and 5B, one of the parts PA stored in the parts storage chamber 43 of the parts feeding mechanism 40 that is in contact with the bottom surface 43a moves under the part's own weight, according to the inclination of the bottom surface 43a toward the parts housing groove 22 which are present in the parts feeding zone. With the orientation of the part PA regulated by the first cutout portion 13a of the disk front surface guide 13 of the device base 10, the part PA approaches one of those parts housing grooves 22 in the parts conveying disk 20 which are present in the parts feeding zone. The part PA is then drawn into the parts housing groove 22 by negative pressure air blown through the second negative-pressure air hole 11i in the device base 10 and acting on an end of the part PA. That is, a longitudinal portion of each of the parts PA stored in the parts storage chamber 43 of the parts feeding mechanism 40 enters, in the lengthwise orientation, one of those parts housing grooves 22 of the parts conveying disk 20 which are present in the parts feeding zone, and the end surface of the part PA comes into contact with the bottom surface of the parts receiving portion 11h of the device base 10.

After the longitudinal portion of the part PA enters, in the lengthwise orientation, the one of those parts housing grooves 22 of the parts conveying disk 20 which are present in the parts feeding zone, the part PA moves toward the parts reorientation zone in conjunction with the intermittent rotation of the parts conveying disk 20, with the longitudinal portion of the part PA having entered the parts housing groove 22 and the end surface of the part PA in contact with the bottom surface of the parts receiving portion 11h of the device base 10. Note that, in a case where a sum of the depth D22 of each parts housing groove 22 and the depth (reference numeral omitted) of the parts receiving portion 11h of the device base 10 is slightly smaller than the reference dimension of the length Lpa (see FIG. 1C) of the part PA minus the minus-side dimensional tolerance, the parts receiving portion 11h of the device base 10 and the first cutout portion 13a of the disk front surface guide 13 each serve to maintain the orientation (posture) of the part PA with the longitudinal portion of the part PA having entered the parts housing groove 22 in the lengthwise orientation.

In the parts reorientation zone, as illustrated in FIGS. 6A and 6B, the part PA with the longitudinal portion of the part PA having entered the one of the parts housing grooves 22 in the parts conveying disk 20 is rotated clockwise in FIGS. 6A and 6B through approximately 90 degrees by positive pressure air blown through the positive-pressure air hole 11k in the device base 10 and acting on the remaining portion of the part PA and negative pressure air blown from the negative-pressure air groove 23 in the parts conveying disk 20 through the first negative-pressure air hole 11j and acting on the remaining portion of the part PA; the rotation of the part PA is assisted by the parts sliding portion 11h1 of the device base 10. That is, after the part PA with the longitudinal portion of the part PA enters the parts housing groove 22 in the parts conveying disk 20, the part PA is reoriented to reorient a surface of the part PA defining the length Lpa by approximately 90 degrees. The reoriented part PA is placed in the parts housing groove 22 in the parts conveying disk 20 in an orientation aligned with the parts housing groove 22.

In the parts reorientation zone, the negative pressure air from the second negative-pressure air hole 11i in the device base 10 acts on the end of the part PA with the longitudinal portion of the part PA having entered the one of the parts housing grooves 22 in the parts conveying disk 20 in the lengthwise orientation. In this case, the part PA can be successfully reoriented by setting the pressure of the negative pressure air lower than the pressure of positive pressure air blown through the positive-pressure air hole 11k in the device base 10 and acting on the remaining portion of the part PA and than the pressure of negative pressure air blown through the negative-pressure air groove 23 in the parts conveying disk 20 and acting on the remaining portion of the part PA, or setting the pressure of the negative pressure air lower than the sum (of absolute values) of the pressure of the positive pressure air blown through the positive-pressure air hole 11*k* in the device base 10 and acting on the remaining portion of the part PA and the pressure of the negative pressure air blown through the negative-pressure air groove 23 in the parts conveying disk 20 and acting on the remaining portion of the part PA.

After being placed in the one of the parts housing grooves 22 in the parts conveying disk 20 in the orientation aligned with the parts housing groove 22, the part PA moves, while remaining in this state, toward the parts insertion position in conjunction with the intermittent rotation of the parts conveying disk 20.

Figure 7A:
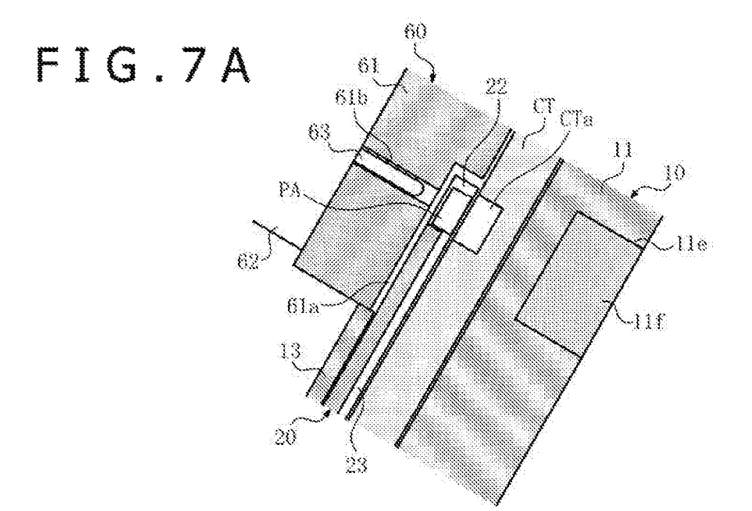
FIG. 7A and FIG. 7B are partially enlarged cross-sectional views (also used as views illustrating operations) illustrating a configuration of a parts insertion position of the taping device illustrated in FIG. 2 and FIG. 3.
Figure 7B:
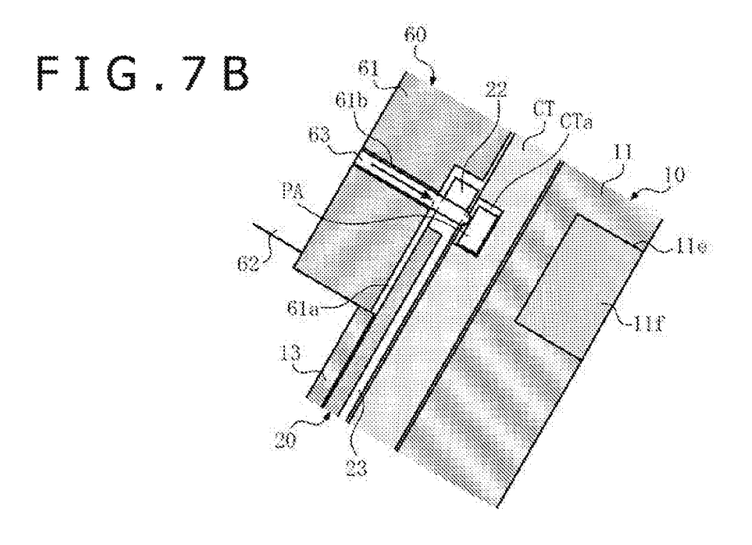

At the parts insertion position, as illustrated in FIGS. 7A and 7B, the part PA housed in the one of the parts housing grooves 22 in the parts conveying disk 20 in the orientation aligned with the parts housing groove 22 is pressed rearward by the parts pressing rod 63 of the parts inserting mechanism 60 and inserted into one of the parts housing recessed portions CTa in the carrier tape CT. The part PA is held in an insertion state by the magnetic force of the permanent magnet 11*f* of the device base 10. That is, the part PA housed in the one of the parts housing grooves 22 in the parts conveying disk 20 in the orientation aligned with the parts housing groove 22 is inserted and placed in one of the parts housing recessed portions CTa of the carrier tape CT.

The feeding, reorientation, and insertion of the part are performed in conjunction with the intermittent rotation of the parts conveying disk 20. Thus, the parts PA stored in bulk in the parts storage chamber 43 are sequentially inserted, one by one, into the parts housing recessed portions CTa of the intermittently traveling carrier tape CT. Furthermore, after the part PA is inserted into one of the parts housing recessed portions CTa of the carrier tape CT, the cover tape attaching mechanism (illustration omitted) attaches, to one surface of the carrier tape CT, a cover tape for closing the parts housing recessed portions CTa. This produces a parts housing tape.

Main advantageous effects produced by the above-described taping device TM will now be described.

<Advantageous Effect 1> In the parts feeding zone, a longitudinal portion of the part PA can be caused to enter one of the parts housing grooves 22 in the parts conveying disk 20 in the lengthwise orientation. In the parts reorientation zone following the parts feeding zone, the part PA with the longitudinal portion of the part PA having entered the one of the parts housing grooves 22 in the parts conveying disk 20 can be reoriented and placed in the parts housing groove 22 in the orientation aligned with the parts housing groove 22. That is, an operation of placing the part PA in one of the parts housing grooves 22 in the parts conveying disk 20 is divided into two stages. Thus, even in a case of small parts PA, the parts PA can be appropriately housed in the parts housing grooves 22 in the parts conveying disk 20 (this corresponds to feeding of the parts PA to the parts conveying disk 20). This allows contribution to improving yield.

<Advantageous Effect 2> Reorientation of the part PA includes reorientation, by approximately 90 degrees, of the surface of the part PA defining the length Lpa of the part PA, facilitating management of the above-described two-staged operation. Specifically, the above-described two-staged operation can be reliably performed simply by managing the angle between the front surface of the outer circumferential portion of the parts conveying disk 20 and the bottom surface 43*a* of the storage chamber 43 of the parts feeding mechanism 40.

<Advantageous Effect 3> To manage the above-described two-staged operation, the disk front surface guide 13 used in the embodiment includes the first cutout portion 13*a* regulating the part PA in the parts feeding zone to cause the part PA to enter one of the parts housing grooves 22 in the parts conveying disk 20 in the lengthwise orientation and the second cutout portion 13*b* permitting reorientation of the part PA in the parts reorientation zone, the first cutout portion 13*a* and the second cutout portion 13*b* being continuously formed. This allows the above-described two-staged operation to be more reliably performed.

<Advantageous Effect 4> One of the two operations of the above-described two-staged operation is an operation of reorienting, in the parts reorientation zone, the part PA with a longitudinal portion of the part PA having entered one of the parts housing grooves 22 in the parts conveying disk 20 in the lengthwise orientation. This operation utilizes positive pressure air and negative pressure air for reorientation acting on the remaining portion of the part PA. This enables the intended reorienting operation to be smoothly performed and allows mitigation of damage to the part PA during reorientation compared to a case where the part PA is mechanically reoriented.

<Advantageous Effect 5> The other of the two operations of the above-described two-staged operation is an operation of causing a longitudinal portion of the part PA to enter one of the parts housing grooves 22 in the parts conveying disk 20 in the lengthwise orientation. This operation utilizes negative pressure air acting on the end of the part PA, allowing the intended entering operation to be smoothly performed.

<Advantageous Effect 6> The bottom surface 43*a* of the parts storage chamber 43 of the parts feeding mechanism 40 is inclined downward toward one of those parts housing grooves 22 in the parts conveying disk 20 which are present in the parts feeding zone, and the device base 10 and the parts conveying disk 20 are similarly inclined rearward. Thus, of the two operations of the above-described two-staged operation, the operation of causing a longitudinal portion of the part PA to enter one of the parts housing grooves 22 in the parts conveying disk 20 in the lengthwise orientation can be efficiently performed on each of those parts housing grooves 22 in the parts conveying disk 20 which are present in the parts feeding zone.

Using FIGS. 9A, 9B, 10A and 10B, the description will now be made for the parts conveying disk 20 suitable for sequentially inserting a plurality of the parts PA into a plurality of the parts housing recessed portions CTa of the intermittently traveling carrier tape CT, the number of the parts PA in this case being the same as the number of the parts housing recessed portions CTa into which the parts PA are inserted at a time.

Figure 9A:
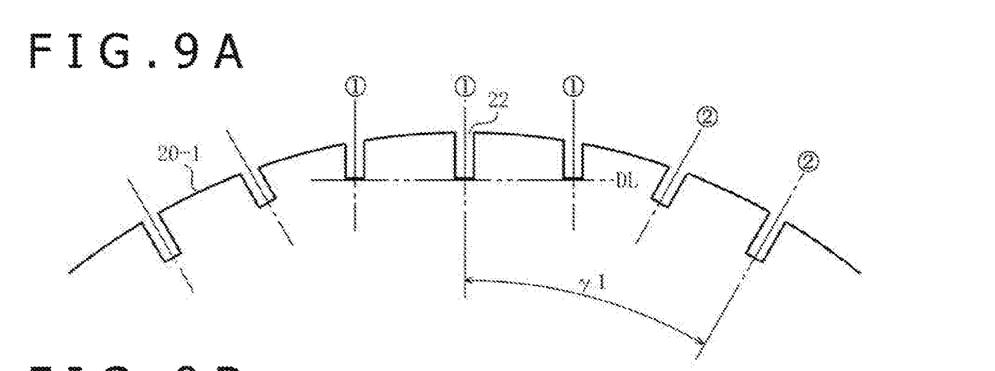
FIG. 9A is a partially enlarged view illustrating a first modification of the parts conveying disk illustrated in FIGS. 4A and 4B.
Figure 9B:
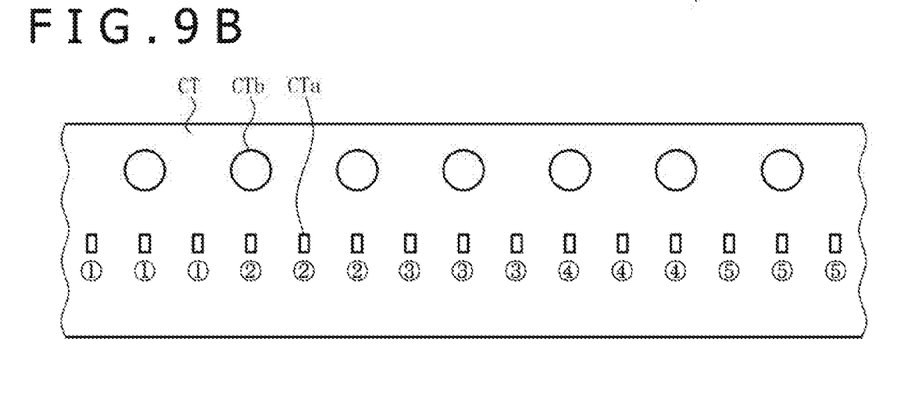
FIG. 9B is a view illustrating a parts inserting method using the parts conveying disk illustrated in FIG. 9A.

FIG. 9A illustrates a first modification of the parts conveying disk 20 illustrated in FIGS. 4A and 4B. A parts conveying disk 20-1 illustrated in FIG. 9A differs from the parts conveying disk 20 illustrated in FIGS. 4A and 4B in that three adjacent parts housing grooves 22 are parallel to one another and that deepest surfaces of the three parts housing grooves 22 are arranged along a straight line DL orthogonal to a widthwise center line of each of the three parts housing grooves 22. Note that the total number of the parts housing grooves 22 in the parts conveying disk 20-1 is a multiple of 3 and that conditions for the length, width, and depth of each parts housing groove 22 are the same as the conditions for the length, width, and depth of each of the parts housing grooves 22 in the parts conveying disk 20 illustrated in FIGS. 4A and 4B.

Furthermore, in a case where the taping device TM is configured with the parts conveying disk 20-1 illustrated in FIG. 9A replaced with the parts conveying disk 20 illustrated in FIGS. 4A and 4B, the following configuration is used to allow three parts PA to be inserted into three parts housing recessed portions CTa at a time: an angle of intermittent rotation of the parts conveying disk 20-1 is changed to an angle γ1 that is three times as large as the angle γ illustrated in FIG. 4A, and the one parts pressing rod 63 coupled to the plunger (illustration omitted) of the parts inserting mechanism 60 is replaced with three parts pressing rods 63.

Operations related to the feeding, reorientation, and insertion of the parts in the taping device TM using the parts conveying disk 20-1 illustrated in FIG. 9A is similar to the corresponding operations of the above-described taping device TM except that, at the parts insertion position, the three parts pressing rods 63 of the parts inserting mechanism 60 are simultaneously moved rearward.

At the parts insertion position, the three parts pressing rods 63 of the parts inserting mechanism 60 are used to press rearward the three parts PA housed in the three parts housing grooves 22 in the parts conveying disk 20-1 in the orientation aligned with the parts housing grooves 22. The parts PA are inserted into the three parts housing recessed portions CTa of the carrier tape CT at a time. That is, in the first insertion, three parts PA housed in the three parts housing grooves 22 denoted by a circled 1 in FIG. 9A are inserted at a time into the three parts housing recessed portions CTa denoted by the circled 1 in FIG. 9B. In the second insertion, three parts PA housed in the three parts housing grooves 22 (one of the three parts housing groove 22 is not illustrated) denoted by a circled 2 in FIG. 9A are inserted at a time into three parts housing recessed portions CTa denoted by the circled 2 in FIG. 9B. Similar batch insertion is subsequently repeated.

In other words, when the taping device TM is configured with the parts conveying disk 20-1 illustrated in FIG. 9A replaced with the parts conveying disk 20 illustrated in FIGS. 4A and 4B, three parts PA can be sequentially inserted into three parts housing recessed portions CTa of the intermittently traveling carrier tape CT at a time. This allows parts insertion to be more quickly achieved, further contributing to improving the yield. Note that this taping device TM can also produce advantageous effects similar to Advantageous Effects 1 to 6 of the above-described taping device TM.

The above-described concept of batch insertion of three parts is also applicable to a case where two parts PA are sequentially inserted into two parts housing recessed portions CTa of the carrier tape CT at a time and a case where four or more parts PA are sequentially inserted into the same number of parts housing recessed portions CTa of the carrier tape CT at a time.

Figure 10A:
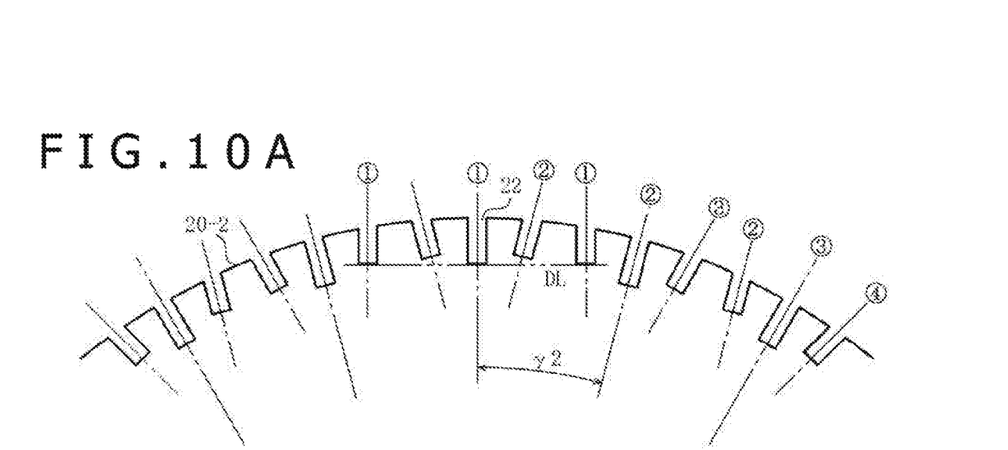
FIG. 10A is a partially enlarged view illustrating a second modification of the parts conveying disk illustrated in FIGS. 4A and 4B.
Figure 10B:
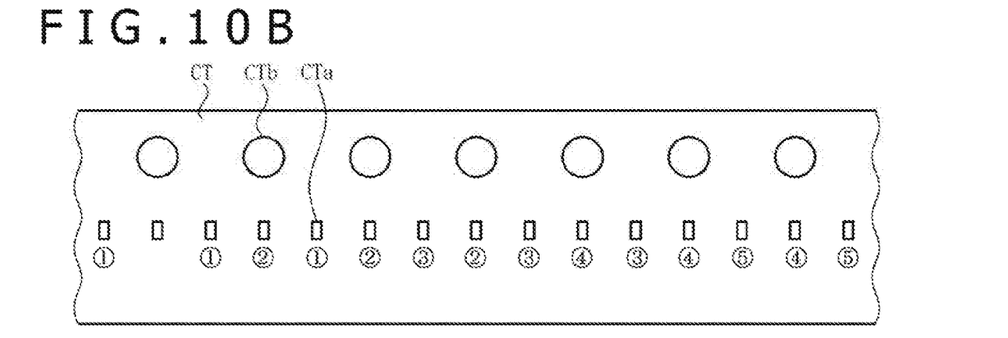
FIG. 10B is a view illustrating the parts inserting method using the parts conveying disk illustrated in FIG. 10A.

FIG. 10A illustrates a second modification of the parts conveying disk 20 illustrated in FIGS. 4A and 4B. A parts conveying disk 20-2 illustrated in FIG. 10A differs from the parts conveying disk 20 illustrated in FIGS. 4A and 4B in that one parts housing groove 22 is added between two adjacent parts housing grooves 22 and that three parts housing grooves 22 arranged every other parts housing groove 22 are parallel to one another and that deepest surfaces of the three parts housing grooves 22 are arranged along the straight line DL orthogonal to the widthwise center line of each of the three parts housing grooves 22. Note that the total number of the parts housing grooves 22 in the parts conveying disk 20-2 is a multiple of 3 and that conditions for the length, width, and depth of each parts housing groove 22 are the same as the conditions for the length, width, and depth of each of the parts housing grooves 22 in the parts conveying disk 20 illustrated in FIGS. 4A and 4B.

Furthermore, in a case where the taping device TM is configured with the parts conveying disk 20-2 illustrated in FIG. 10A replaced with the parts conveying disk 20 illustrated in FIGS. 4A and 4B, the following configuration is used to allow three parts PA to be inserted into three parts housing recessed portions CTa at a time: an angle of intermittent rotation of the parts conveying disk 20-1 is changed to an angle γ2 that is 1.5 times as large as the angle γ illustrated in FIG. 4A, and the one parts pressing rod 63 coupled to the plunger (illustration omitted) of the parts inserting mechanism 60 is replaced with three parts pressing rods 63.

Operations related to the feeding, reorientation, and insertion of the parts in the taping device TM using the parts conveying disk 20-2 illustrated in FIG. 10A are similar to the corresponding operations of the above-described taping device TM except that, at the parts insertion position, the three parts pressing rods 63 are simultaneously moved rearward.

At the parts insertion position, the three parts pressing rods 63 of the parts inserting mechanism 60 are used to press rearward the three parts PA housed in the three parts housing grooves 22 in the parts conveying disk 20-2 in the orientation aligned with the parts housing grooves 22. The parts PA are inserted into the three parts housing recessed portions CTa of the carrier tape CT at a time. That is, in the first insertion, three parts PA housed in the three parts housing grooves 22 denoted by a circled 1 in FIG. 10A are inserted at a time into the three parts housing recessed portions CTa denoted by the circled 1 in FIG. 10B. In the second insertion, three parts PA housed in the three parts housing grooves 22 denoted by a circled 2 in FIG. 10A are inserted at a time into three parts housing recessed portions CTa denoted by the circled 2 in FIG. 10B. Similar batch insertion is subsequently repeated.

In other words, when the taping device TM is configured with the parts conveying disk 20-2 illustrated in FIG. 10A replaced with the parts conveying disk 20 illustrated in FIGS. 4A and 4B, three parts PA can be sequentially inserted into three parts housing recessed portions CTa of the intermittently traveling carrier tape CT at a time. This allows parts insertion to be more quickly achieved, further contributing to improving the yield. Furthermore, the parts conveying disk 20-2 allows three parts to be inserted at a time similarly to the parts conveying disk 20-1 illustrated in FIG. 9A, but is capable of halving the angle γ2 of intermittent rotation of the parts conveying disk 20-1. This enables a reduction in time needed for the intermittent rotation of the parts conveying disk 20-2, particularly the time needed for a rotation process, allowing parts insertion to be more quickly achieved. Note that this taping device TM can also produce advantageous effects similar to Advantageous Effects 1 to 6 of the above-described taping device TM.

The above-described concept of batch insertion of three parts is also applicable to a case where two parts PA are sequentially inserted into two parts housing recessed portions CTa of the carrier tape CT at a time and a case where four or more parts PA are sequentially inserted into the same number of parts housing recessed portions CTa of the carrier tape CT at a time.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2018-072909 filed in the Japan Patent Office on Apr. 5, 2018, the entire content of which is hereby incorporated by reference.

What is claimed is:

1. A taping method comprising:
    sequentially inserting parts into parts housing recessed portions of an intermittently traveling carrier tape,
    the sequentially inserting including intermittently rotating a parts conveying disk with parts housing grooves in an outer circumferential surface of the parts conveying disk at regular angular intervals, feeding, in a parts feeding zone, the parts into the parts housing grooves, and inserting, at a parts insertion position, the parts from the parts housing grooves into the parts housing recessed portions, wherein
        each of the parts is shaped generally like a rectangular parallelepiped having a relationship of length>width and height, and each of the parts housing grooves is shaped generally like a rectangular parallelepiped having a length larger than a length of the part and having a width and a depth larger than a width and a height of the part,
        the part is fed in the parts feeding zone such that a longitudinal portion of the part enters one of the parts housing grooves in a lengthwise orientation, and
        a parts reorienting mechanism reorients, in a parts reorientation zone set between the parts feeding zone and the parts insertion position, the part with the longitudinal portion of the part having entered the parts housing groove to place the part in the parts housing groove in an orientation aligned with the parts housing groove.

2. The taping method according to claim 1, wherein reorientation of the part includes reorientation, by approximately 90 degrees, of a surface of the part defining the length of the part.

3. The taping method according to claim 1, wherein the parts reorienting mechanism includes a positive-pressure air hole used to cause positive pressure air for reorientation to act on a remaining portion of the part with the longitudinal portion of the part having entered the parts housing groove.

4. The taping method according to claim 3, wherein the parts reorienting mechanism includes a negative-pressure air groove used to cause negative pressure air for reorientation to act on a remaining portion of the part with the longitudinal portion of the part having entered the parts housing groove, and a first negative-pressure air hole used to cause negative pressure air for reorientation to act on the negative-pressure air groove.

* * * * *